United States Patent [19]

Cody et al.

[11] Patent Number: 5,735,943
[45] Date of Patent: Apr. 7, 1998

[54] RHEOLOGICAL ADDITIVES FOR ASPHALT AND OTHER ORGANIC SYSTEMS COMPRISING ONE OR MORE ORGANOCLAYS AND FIBROUS MATERIAL, A PROCESS FOR PRODUCING SUCH ADDITIVES AND ORGANIC SYSTEMS CONTAINING SUCH ADDITIVES

[75] Inventors: Charles A. Cody, Robbinsville; Steven Kemnetz, Trenton, both of N.J.

[73] Assignee: Rheox, Inc., Hightstown, N.J.

[21] Appl. No.: 707,563

[22] Filed: Sep. 4, 1996

[51] Int. Cl.$^6$ .............................. C09D 7/12; C09D 101/02
[52] U.S. Cl. .......................... 106/164.3; 106/164.51; 106/287.17
[58] Field of Search ..................... 106/162.1, 164.3, 106/164.31, 287.17

[56] References Cited

U.S. PATENT DOCUMENTS 5,151,155  9/1992  Cody et al. ........................ 162/5

Primary Examiner—David Brunsman
Attorney, Agent, or Firm—Michael J. Cronin

[57] ABSTRACT

The present invention involves the discovery that an organoclay made by the reaction of smectite day and a quaternary ammonium compound (quat) can be mixed with fibrous material such as wastepaper pulp to form a unique theological additive for organic fluid systems. Such a theological additive has broad uses, is cost effective, and is particularly useful as a rheological additive for asphalt and organic paints and coatings. In an important aspect the invention is a rheological additive providing inexpensive, effective and efficient rheological properties when used at low levels in organic systems.

12 Claims, No Drawings

RHEOLOGICAL ADDITIVES FOR ASPHALT AND OTHER ORGANIC SYSTEMS COMPRISING ONE OR MORE ORGANOCLAYS AND FIBROUS MATERIAL, A PROCESS FOR PRODUCING SUCH ADDITIVES AND ORGANIC SYSTEMS CONTAINING SUCH ADDITIVES

BACKGROUND OF THE INVENTION

1. Field of the Invention

Organoclays made from smectite-type clays have been found to be useful in a variety of ways in many commercial fields. Organoclays are the reaction product of a smectite clay, such as bentonite or hectorite, and one or more quaternary ammonium compounds and are fully defined hereafter. An important use is as a rheological additive or agent to improve the flow and viscosity properties of organic and solvent-based fluid systems such as construction compositions and paints and coatings.

The present invention involves the discovery that an organoclay, made by the reaction of smectite clay and a quaternary ammonium compound (quat), which reaction is performed either ex situ or in the presence of fibrous material, can be used or mixed with these same fibers or similar fibers to form a unique and highly effective rheological additive. Such a rheological additive is inexpensive to produce and has broad uses, and has been particularly found effective as a rheological additive for asphalt and other highly viscous systems as well as for organic-based paints, resins and coatings.

If organoclays are combined with fibrous, usually organic material, such as waste paper pulp, ground newsprint, or cotton or vegetable-derived fibers, a novel rheological additive is created which possesses both especially advantageous viscosifying qualities and cost-effectiveness when used to viscosify non-aqueous systems.

Another significant advantage of the presence of the fibrous material is that a range of organoclay/fiber mixtures can be used to form products other than rheological additives, for example, a useful cold temperature oil spill remediation agent, especially when used with organoclays prepared from quaternary ammonium compounds containing $C_{16}$ and shorter alkyl groups; this aspect is described in and covered by copending U.S. patent application Ser. No. 08/421,106, and a divisional application thereto, by the same inventors hereof.

The present invention includes a process for making such rheological additives as well as organic fluid systems containing such additives.

2. Description of the Prior Art

Rheological additives can be defined as substances added to liquid systems which change the system's flow and viscosity properties. Proper rheology for flow and application must be balanced with the requirement of no sagging or dripping after application. The science of rheology, which is a part of the science of the deformation and flow of fluid matter, in essence permits the application of shearing force, such as through the use of paint brush or a spray apparatus, to effectuate a temporary reduction in the liquidity and viscosity of the system. When the shearing force is removed (when the liquid system has been deposited on a coated surface, for example) the system regains its initial, fairly high viscosity.

Organophilic clays are modified smectite-type clays prepared by the reaction of an organic cation, usually a quaternary ammonium chloride compound, with a smectite-type clay utilizing various processes now well known in the art. In addition, it has been known since the mid-1940's that organophilic clays made from smectite clays, also referred to as "organoclays," could be used as thixotropic agents or rheological additives to provide various rheological properties to a variety of organic liquid compositions. Smectite clays themselves, while dispersible in water, and having been used for centuries to thicken aqueous systems, are not dispersible in organic fluids. If the organic cation reacted with the smectite clay contains at least one organic fatty group with preferably 6–10 or more carbon atoms, such "reaction-product" organoclays have the ability of dispersing into, and modifying and controlling the viscosity of, organic liquids. These organoclays, over the last fifty years, have found a ever-increasing market imparting desirable theological properties to an increasingly wide number of such systems, including asphalts, grouts, paints, inks, coatings, adhesives, drilling fluids and similar fluids.

Organic and solvent-based fluids include paints, polyester resins, construction materials (particularly asphalt), coatings, and inks utilized in numerous aspects of our industrial society. Depending on the requirements of manufacturers and the particular type of fluid systems, the commercial products made using the inventive rheological compositions are useful in protective construction coatings, inks, sealants, paper coatings, adhesives, petroleum drilling fluids, completion fluids, and the like.

U.S. Pat. No. 4,664,820, issued to the assignee hereof, describes the preparation of organophilic clays, some of which have become commercial products, that are used to thicken organic systems. Dr. J. W. ("Spike") Jordan, a then newly retired senior scientist formerly employed by the assignee hereof, in "Proceedings of the 10th National Conference on Clays and Clay Minerals" (1963), incorporated herein by reference, discusses a wide range of applications, as then known, of such organoclays from high polarity organic liquids to low polarity solvent liquids. Such organoclays may function to viscosify both polar or non-polar solvents, depending on the substituents on the organic cation. For purposes of this patent the terms, "organic" and "solvent" systems are used to mean essentially the same thing.

Newer organophilic clay gellants have been developed since 1963 which are the reaction products of smectite-type clays with certain organic cations or mixtures of organic cations, and organic anions or anion combinations. These more recent organoclays have the advantage of being easily dispersible in particular types of organic and solvent compositions without the need for dispersion aids or polar activators under normal dispersion conditions. Illustrative patents which describe such improved organophilic clays are U.S. Pat. Nos. 4,208,218; 4,412,018; 4,450,095; and 4,517,112.

More recent U.S. patents issued to the assignee hereof show various uses of organoclays and processing improvements in making such organoclays using quaternary ammonium compounds. These patents include U.S. Pat. Nos. 5,034,136; 5,075,033; and 5,151,155, see also U.S. Pat. No. 5,336,647 and U.S. Pat. No. 5,429,999; U.S. Pat. No. 5,336,647 details in some length the constituents of specific quaternary compounds useful in making commercial organoclays known as of its filing date.

DESCRIPTION OF THE PREFERRED EMBODIMENTS

SUMMARY OF THE INVENTION

In an important aspect, the invention is a rheological additive providing effective and efficient theological properties to organic fluid systems when used at low levels.

In one specific aspect, the invention provides a rheological additive comprising:

a) one or more organoclays made by the reaction of smectite clay and one or more organic cations such as quaternary ammonium compounds at a percent organic of from about 80% to about 140% of the cation exchange capacity of the smectite clay and optionally the organic cation reacted with one or more organic anions, and b) one or more fibrous materials.

As stated above, one component of the present composition invention, component a), is an organophilic clay. These organophilic clays are prepared by reacting water-swellable smectite-type clay with an organic cation or cations provided by specific quaternary ammonium compounds.

The clays used to prepare the organophilic clays of this invention are cation-exchangeable smectite clays which have a cation exchange capacity of about 75 or greater milliequivalents per 100 grams of clay, 100 percent active basis (i.e. beneficiated and essentially free of non-clay impurities). Smectite-type clays are well known in science, geology and in the art of rheological additives, and are commercially available from a variety of sources both in the United States and throughout the world. They are unique among clays in that they exhibit the phenomena of swelling to many times their size when contacted with water.

Chemical formula descriptions of representative natural smectite clays particularly useful in accordance with the present invention are as follows:

Hectorite

where $0.57 \leq x \leq 1.15$, $f \leq 4$ and R is selected from the group consisting of Na, Li, NH$_4$, and mixtures thereof;

Bentonite

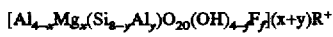

where $0<x<1.10$, $0<y<1.10$, $0.55 \leq (x+y) \leq 1.10$, $f \leq 4$ and R is selected from the group consisting of Na, Li, NH$_4$ and mixtures thereof;

Types of smectite clays considered applicable for the best practice in the present invention can also be grouped in general as three-layer types (sheet structures composed of two layers of silica tetrahedrons and one central dodecahedral or trioctahedral) as follows:

1. Expanding lattice clays such as equidimensional smectite-type clays, including montmorillonite, bentonite and elongated smectite clays including saponite;
2. Nonexpanding lattice clays including mixed-layer types (ordered stacking of alternate layers of different types); and
3. Clays which by their generic reference fit into more than one of the above-described classification groups. "Generic reference" clays all have the common characteristics of mineral—containing silicates.

Cation-exchangeable smectite-type clays can also be synthesized, usually starting with a naturally-obtained montmorillonite base clay, so as to possess certain chemical and physical characteristics, in order to make such clays valuable in the practice of the present invention. Smectite-type clays prepared synthetically by either a pneumatolytic or, preferably, a hydrothermal synthesis process may also be used to prepare the novel products of this invention.

The above-described clays, especially the bentonite-type clays, are preferably converted to the sodium form if they are not already in this form. Commercially important representatives of such smectite clays used to make the organoclays of this invention are sodium bentonite, calcium bentonite and hectorite.

The most preferred smectite clays used in the present invention are bentonites, particularly Wyoming bentonite, with sodium bentonite preferred, and hectorite, with particularly hectorite from Hector, Calif. in the Mojave Desert preferred. Bentonite and hectorite clays react easily with the specific organic quaternary compounds described hereafter.

In addition, it will be understood that the above-listed smectite-type clays which have been subjected to the application of shear may also be used to make the organoclay component of the instant invention. To achieve shearing of the smectite-type clay, the clay is typically dispersed in water at a concentration of from about 0.5 to about 80% by weight. Shear can be imparted to the smectite-type clay slurry by means of commercially available equipment that is known to impart high shear to the material. Illustrative of such equipment is a Manton-Gaulin Homogenizer available from the APV Gaulin Company. Representative processes for shearing clay slurries are described in U.S. Pat. No. 4,743,098 which is herein incorporated by reference.

As discussed above, organoclays are formed using water-swellable smectite clay (most often bentonite or hectorite) which are reacted with one or more quaternary ammonium compounds, and optionally with one or more organic anions. The specific quaternary ammonium compounds selected will affect the resulting organoclay's performance for a particular organic system. The quaternary selected effects the percent dispersion and the resulting dispersion influences the rheology characteristics of the system into which the organoclay is incorporated.

The organic cations which are useful to make the organoclay component of this invention may be selected from a variety of nitrogen-based quaternary materials that are capable of exchanging cations with the selected smectite-type clay. The organic cations which are reacted with smectite type clay to prepare the organophilic clay component of the instant invention have a positive charge localized on a single nitrogen atom within the compound.

One form of quaternary ammonium compounds which are useful making organoclays to be used in the inventive theological additive compositions hereof are those having the formula:

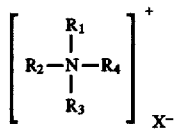

wherein R$_1$ comprises a lineal or branched aliphatic hydrocarbon group having from about 6 to about 30 carbon atoms; R$_2$, R$_3$ and R$_4$ are independently selected from the group consisting of (a) lineal or branched aliphatic groups having from 1 to about 30 carbon atoms; (b) ethoxylated groups containing from 1 to about 80 moles of ethylene oxide; (c) aromatic groups; and (d) hydrogen; and X$^-$ comprises an anion, preferably chloride.

Typical quaternary compounds of the above type useful for preparing the organoclay component of the invention are methyl tris[hydrogenated tallow] ammonium chloride (M3HT) and dimethyl bis[hydrogenated tallow] ammonium chloride (2M2HT) when M represents methyl and HT represents (stands for) hydrogenated tallow derived compounds. These examples of suitable hydrophobic quaternary ammonium compounds to make such organoclays can be described chemically as follow:

Methyl tris[hydrogenated tallow] ammonium chloride (M3HT):

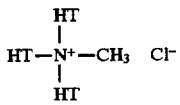

Dimethyl bis[hydrogenated tallow] ammonium chloride (2M2HT):

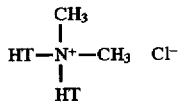

The raw materials used to make the useful quaternary amonium compounds are most preferrably derived from natural oils such as tallow, soya, coconut and palm oil. The aliphatic groups in the above formula may also be derived from other naturally occurring oils including various vegetable oils, such as corn oil, coconut oil, soybean oil, cottonseed oil, castor oil and the like, as well as various animal oils or fats. The aliphatic groups may also be petrochemically derived from, for example, alpha olefins.

Representative examples of useful branched, saturated radicals include 12-methylstearyl and 12-ethylstearyl. Examples of useful aromatic groups, that is benzyl and substituted benzyl moieties, include materials derived from, e.g., benzyl halides, benzylhydryl halides, trityl halides, α-halo-α-phenylalkanes wherein the alkyl chain has from 1 to 22 carbon atoms, such as 1-halo-1-phenyloctadecane; substituted benzyl moieties, such as those derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as those derived from 2-halomethylnaphthalene, 9-halomethylanthracene and 9-halomethylphenathrene, wherein the halo group comprises chloro, bromo, or any other such group which serves as a leaving group in the nucleophilic attack of the benzyl type moiety such that the nucleophile replaces the leaving group on the benzyl type moiety.

Useful quaternary ammonium salts for purposes of the instant invention also include hydrophobic quaternary ammonium salts, such as monomethyl trialkyl quaternaries, as well as hydrophilic quaternary ammonium salts, such as water-dispersible, ethoxylated quaternary ammonium compounds, and mixtures thereof.

Another group of organoclays useful to prepare the inventive additives are organoclays of the type previously discussed but, in addition, containing intercalated anions; see U.S. Pat. No. 4,517,112, for example, for a description of these types of organoclay products. In these materials one or more anions have been complexed with the quaternary amonium ion before, during or after organoclay formation.

The organic anion(s) optionally employed in preparing the organoclay component of the invention may also be selected from a wide range of materials that are capable of reacting with the organic cations in order to form an organic cation/organic anion complex. The molecular weight of the organic anion is preferably 3,000 or less, and more preferably 1,000 or less, and contains at least one anionic moiety per molecule so as to permit the formation of the organic cation/organic anion complex which then becomes intercalated between the clay platelets. Preferred organic anions are derived from carboxylic acids, such as stearic acid, oleic acid, palmitic acid, succinic acid, tartaric acid, sulfonic acids, and alkyl sulfates, such as the lauryl half ester of sulfuric acid, and mixtures thereof. Some particularly preferred anions useful for this application include citric acid, 12-amino dodecanoic acid, stearic acid and tartaric acid.

Also useful for this invention are quaternaries derived in whole or in part from organic acid—derived esters ("ester quats"). These type organoclays are more completely described in presently pending U.S. patent application Ser. No. 08/621,932, assigned to the assignee hereof. The ester organic cation is provided by a quaternary ammonium compound selected from the group consisting of the following formula:

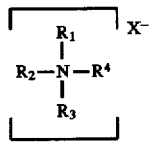

wherein $R_1$ is an alkyl or aralkyl-ester group having 8 to 30 carbon atoms as described below and $R_2$, $R_3$ and $R_4$ are independently selected from the group consisting of (i) $R_1$, (ii) long chain linear or branched alkyl (including methyl), aliphatic or aromatic groups having 1 to 30 carbon atoms (such groups can also include hydroxylated groups); (iii) aralkyl groups, which are benzyl and substituted benzyl moieties, including such groups having fused ring moieties having linear chains or branches of 1 to 30 carbon atoms; (iv) aryl groups such as phenyl and substituted phenyl including fused ring aromatic substituents; (v) beta, gamma Unsaturated groups having six or less carbon atoms or hydroxyalkyl groups having 2 to 6 carbon atoms; and (vi) hydrogen. $X^-$ is an anion, typically chloride, methyl sulfate, acetate, iodide and bromide, preferably chloride.

This ester quaternary ammonium compound must contain at least one linear or branched, saturated or unsaturated alkyl or aralkyl-ester $R_1$ group having 8 to 30 carbon atoms. Such ester groups are of the general formula:

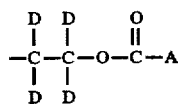

where each D is independently selected from the group consisting of H, $CH_3$ and $C_2H_5$ and A is an alkyl or aralkyl radical group.

The organophilic clay component of this invention can be prepared by admixing the clay and organic cation (quat) together, preferably at a temperature within the range from 20° C. to 100° C., more preferably 60° C. to 75° C., for a period of time sufficient for the organic cation to react with the clay particles, typically 20 minutes to one hour followed optionally by recovery by filtration, washing, drying and grinding as necessary. The particle size distribution of the organoclay, which plays a role in its effectiveness, can be controlled by grinding, with smaller particle sizes permitting improved dispersion. The smectite clay used during manufacture of the organoclay can be dispersed in a water slurry at a concentration of from about 1 to about 80%, and preferably from about 2% to about 7%; the clay/water slurry optionally may be centrifuged to remove non-clay impurities which often constitute from about 10% to about 50% of a starting natural clay composition; the slurry is agitated by stirring or other means, and heated to a temperature in the range of from 140° F. (60° C.) to 170° F. (77° C.); the special quaternary ammonium compounds is added as described, preferably as a liquid in isopropyl alcohol or in a non-traditional solvent such as soya oil; and the agitation is continued to effect and complete the reaction. Blending of a dry clay and the quaternary compound, such as with a pugmill, is another way of making an organoclay, and in some cases may be preferable where cost is a factor.

The amount of the organic quaternary ammonium compound added to the clay must be sufficient to impart to the organoclay the particular characteristics desired. The amount of quat reacted with clay is approximately calculated as a percent of the cationic exchange capacity of the smectite clay, i.e., the milliequivalent amount of quaternary amine reacted with 100 g clay, divided by the cation exchange capacity of the clay sample expressed as milliequivalents per 100 grams of pure clay, times 100, equals the percent organic, hereafter referred to in this application as "percent organic." The cation exchange capacity (CEC) of the clay can be determined using the methylene blue spot test which is well known in the art. Most commercially available bentonite and hectorite clays typically have a CEC of about 100. The organophilic clays of this invention should be prepared using from about 80% to about 140% percent organic of quat. At lower percentages, the organophilic clays are ineffective as to dispersibility when used as a component of the inventive rheological additive; at higher percentages, the organophilic clays may release unwanted amines into the organic systems in which they are used. The preferred percent organic within the range of from about 80% to about 140% may vary depending on the characteristics of the organic fluid system to be treated, with the most preferred amount generally being slightly higher than the cation exchange capacity of the smectite clay.

The organoclay used in this invention can also be prepared in situ in an aqueous system also containing the second component of the inventive rheological additive.

As discussed above, the second important component of the present invention, component b), is an fibrous material such as waste paper pulp. Most such fibrous materials are organic-derived. This component includes organic fibrous material, such material as paper pulp including waste newspaper pulp, cotton fiber and vegetable fiber as well as non-organic fibers such as glass fiber. For example, almost all types of waste paper can be used in the inventive composition, including pulped waste newsprim, magazines, cartons, legal forms and papers, and the like.

Fibrous material useful for this invention can vary widely. The following list of fiber materials useful for this invention is provided:

I. Composition: Organic or Inorganic, Natural or Synthetic
 Examples of natural fibers useful for this invention:
 1) Wood (cellulose) particularly in paper form
 2) Wool
 3) Cotton
 4) Hemp
 Examples of synthetic fibers useful for this invention include:
 1) Rayon
 2) Polyester
 3) Glass and glass wool II. Color: All colors for fiber are useful for organic systems such as asphalt. Other organic systems may prefer a specific color or neutral pigmentation.

III. Clarity: Opaque or Transparent

IV. Size: Aspect Ratio≧5:1
V. Shape/Geometry—Fiber cross section:
 1) Circular
 2) Elliptical
 3) Irregular
 4) Ribbon like
 5) Square, rectangle
 6) Triangular Paper and waste paper can be obtained from a large number of recyclers, including governmental authorities. For example, Atlantic Coastal Fiber Inc. sells shredded dry newsprint from East Coast recycling centers. Champion Paper Company sells various grades of pulp, including deinked newsprint; these are normally sold as a wet aqueous "lap" at around 50% solids. Unbleached kraft paper, also normally sold at 50% solids, is particularly useful for this invention. Often, since waste paper-derived pulp is sold as a waste material, there may be no charge for the material, except shipping costs.

Most preferred for purposes of this invention are unbleached paper fibers, deinked and bleached waste paper fiber obtained from newsprint and shredded waste newsprint not otherwise treated.

There is a relationship between the fiber length of the fibrous material utilized and effectiveness with longer fiber length being preferred when higher Brookfield viscosities are desired. Long fiber length, in addition, give improved tensile strength when compared with shorter length fibers.

Organoclays can first be made using standard manufacturing processes and then physically mixed with fiber such as waste paper to form the inventive rheological additive of this invention. Both aqueous slurry proccessing and pugmill processes, each well known in the art, can be used to make the organoclay ex situ. An alternative method of making the inventive composition is by preparing, for example, a waste paper pulp from newsprint using a wide variety of conventional techniques with conventional pulping equipment, and adding the waste paper pulp to an aqueous slurry containing bentonite or hectorite, or vice versa, and then adding a quaternary compound or compounds to the slurry to form an organoclay in situ in the waste pulp. It has been found that waste paper shredded in an aqueous slurry containing bentonite clay using a paper pulper and then reacting the clay with a quaternary such as M3HT or 2M2HT or a quaternary/soya oil composition is a particularly preferred embodiment. A preferred ratio of 50% paper pulp to 50% organoclay composition is generally effective, although other ratios within a wide range are also useful, depending upon the applications.

A representative process for preparing the rheological additives of this invention may be described more particularly as:

(a) preparing a slurry of smectite-type clay having a cation exchange capacity of at least 75 milliquivelents per 100 grams of natural clay (calculated without impurities) in water at 1 to 20% by weight of said clay;

(b) heating said slurry to a temperature between 20° C. and 100° C.

(c) adding to such slurry an organic cation in an amount to satisfy the cation exchange capacity of the smectite-type clay while agitating the reaction solution;

(d) continuing the reaction for a sufficient time to form a reaction product comprising an organoclay;

(e) adding and then mixing waste paper such as pulped newsprint into the slurry, and (f) then recovering, drying, and grinding the resultant product.

The addition of relatively inexpensive waste newspaper pulp, for example, to the organoclay to form the inventive composition represents a significant cost reduction in the product's raw material cost as well. This, in conjunction with excellent improvements made in Brookfield viscosity, leneta and sag, to the fluid to be rheologically treated, provides the industry with a particularly valuable product. Not wishing to be bound by theory, it is believed that the formation of the organoclay/organic fibrous material product greatly increases the surface area of the organoclay component, allowing organic fluid systems to more readily wet the organoclay's surface, leading to greater dispersibility and functionality. Additionally, the presence of the highly dispersible fiber is also surprisingly beneficial, leading to improved sag and leveling measurements.

A representative organic fluid system prepared using the rheological additives of this invention may be described more particularly as follows:

An organic fluid system which comprises:
(a) a non-aqueous composition; and
(b) a rheological additive comprising:
  (i) one or more organoclays made by the reaction of smectite clay and one or more quaternary ammonium compounds at a percent organic of from about 80% to about 140% of the cation exchange capacity of the clay and;
  (ii) one or more fibrous materials.

The use of the additives dispersed herein has particular value in imparting rheological properties to highly viscous systems.

There are in commercial use in the United States, Canada and Europe a number of organic coating systems utilizing highly viscous, very thick coating compositions. A highly viscous system is generally a composition that at room temperature displays a viscosity of about $4 \times 10^6$ centipoise or greater (as measured with a Brookfield Helipath viscometer using a TF spindle at 2.5 pm).

The following paragraphs provide a description of these systems, and a short list of their peculiar requirements as to rheology.

Asphalt is a brown-to-black-colored bituminous material with a pitchy luster. It is naturally occurring throughout the world. Approximately 98% of the asphalt used in the United States, is derived from oil by the removal of volatile, lighter-weight components from naturally occurring petroleum. The typical process separates these components by evaporation or fractionalization. Asphalt has been utilized in the United States for at least a hundred years in a wide variety of commercial applications. Such uses include infrastructure construction uses, most particularly in the design and development of roads and coatings, particularly on building roofs.

Asphalt is largely composed of heterocyclic and other hydrocarbon compounds. Normal asphalt contains components with molecular weights from about 500 to about 5000. Asphalt is highly viscous, thermoplastic and viscoelastic; that is, at normal temperature it is of heavy consistency, almost gel-like. In some cases it is close to being non-fluid.

Of growing importance has been the use of special asphalt formulations designed for the coating of surfaces. These coatings protect such surfaces against weather, particularly water and rain, and prevent the occurrence of damage such as rust. Asphalt is used to protect the under-surface of trucks, construction equipment, military vehicles, and automobiles from degradation caused by constant exposure to weather, water, snow and rain, road chemicals, and adverse climate. Almost all vehicles sold in the United States and Canada have had an asphalt treatment applied to their underbody for these protective purposes. Asphalt used for undercoats is called air-blown asphalt, and is produced by contacting asphaltic derivatives with pressurized air at a temperature of approximately 500° F. After application, the viscosity of such asphalt is less susceptible to temperature changes than is the type of asphalt used in highway construction.

Use of asphalt also occurs in providing protective coatings for containers used to transport various types of goods and cargo, particularly over water, or where exposure to the elements of rain and snow are known to occur.

While other types of application equipment, including brushes, are utilized, it is today common practice to use spray equipment to apply asphalt for use as a protective coating. Spraying allows a large amount of product to be applied in a short time. Spraying permits constant operation by the connection of a product reservoir with pressurizing equipment, a pipeline, and a spray head. To be successfully applied using spray apparatus, asphalt must be capable of being made very liquid and "sprayable." Simultaneously and in contradistinction, following application the asphalt must not run or drip and must quickly, if not nearly instantaneously, become highly viscous.

To achieve both effects, that is making asphalt virtually liquid during spraying and highly gelled without sagging or dripping shortly after application, rheological/thixotropic agents are generally employed. In order to incorporate such agents, asphalt is normally heated to approximately 120° F. or higher to make the asphalt less viscous, facilitating dispersion of the agent into the system.

Creosote is an oily product of tar distillation, largely obtained in the modern era by carbonization of soft coal at high temperatures. It is also still made in some limited quantity from wood tar. Creosote oil makes up about 30% of coal and wood tar. Creosote finds large use in wood treatment as a protective coating, for exposed wooden surfaces and some additional use in the protection of fruit and walnut trees. Its successful application requires its incorporation in a system providing the same rheological properties previously described for aspbaltic protective coating systems. At room temperature, creosote is gum-like and highly viscous. Creosote application to wood and other surfaces therefore often requires the addition of thixotropic agents.

Pitch products are similar to asphalt and creosote. Pitch is the heavy, non-volatile residue of coal tar after fractional distillation to remove creosote and other lighter components. It may contain as many as 5000 separate chemical components. Pitch is used largely in commerce as a coating to protect flat roofs from weather, finding use in this regard as a protective membrane on the roofs of apartments, office complexes, parking garages, and other commercial buildings of many types. Its application to these various surfaces is at high temperature, and presents substantially similar use complexities as does asphalt and creosote. Mastic, a glass-like yellow substance used in adhesives, and occasionally mixed with finely-powdered rock and/or asphalt, causes similar application concerns.

The rheological additive produced utilizing the instant invention is an effective rheological agent for viscous systems, most particularly for asphalt, and when used as described permits the substantial elimination of the need for polar activators in dispersing the rheological agent into such systems. The fluid to be thickened comes therefore more readily into contact with the organoclay particles. The high viscosity pitch-like products in which the inventive products are useful include asphalt, creosote, mastics, heavy resins, pitch, thick gums, highly viscous waxes and the like. Most organic systems generally require some heating to facilitate incorporation of the thixatropic additive.

The rheological additive of the invention is dispersed using mixing and dispersion machinery into organic fluid systems in amounts sufficient to obtain the desired rheological properties, such as high viscosity at low shear rates, control of sagging of fluid fills, and prevention of settling. Amounts of the inventive organophilic clay/fiber thixotrophic agent employed in the organic system involved should be between about 0.1% and about 10% based on the weight of the system, and preferably between 0.3% and 5.0%, to yield the desired rheological and thixotropic effects.

Organoclay/organic fibrous compositions can find practical applications in many areas, including asphalt roof coating formulations. In these applications it is important that the additives impart good rheological properties to their respective systems. High viscosities with thixotropic flow properties are desirable for successful additives in these applications. Thixotropic properties are of value because the systems will lose viscosity when sheared to allow for ease of application to a substrate. The additives can also be used in relatively low viscosity systems such as polyester resins.

It should be understood that the organoclay/fiber compositions of this invention may further comprise other active ingredients and other components. Applicants' unique rheological agents may contain additional ingredients and chemicals, such as polar activators, which may, in certain circumstances, aid in overall practice of this invention. Other active or inactive additives and chemicals can be incorporated as well to fulfill ancillary or unrelated purposes. Such chemicals could include pigments, such as titanium dioxide or dyes for oil-marking purposes, and bacterial agents to aid in oil in-situ digestion.

EXAMPLES

The following examples are given to illustrate the invention, but are not deemed to be limiting thereof.

Example 1

A first series of experiments were designed to study the influence of varying the 2M2HT to clay ratio in conjunction with various fiber loadings in a grid study. These samples were prepared by mixing and reacting the raw materials in a pug mill. Crude bentonite clay was mixed with paper pulp then reacted with Kernamine Q-9702 (2M2HT). The paper pulp was derived from newsprint that was shredded and pulped wet to breakdown the paper into loose fibers. The pulp was filtered to increase the solids content then mixed with various amounts of crude bentonite clay. The mixture was heated at 65° C. in a forced air oven then reacted with various amounts of molten 2M2HT through the pug mill. The amount of 2M2HT used was 100 and 120 milliequivalents (meq) per 100 grams of clay (after correcting for the % gangue). The material was passed through the pug mill a second time to ensure good uniformity, then dried at 105° C. in a forced air oven. The resulting material was milled in a centrifugual mill using a 4.0 mm screen.

These samples were incorporated into an asphaltic system typically used for roof coatings with test results listed in Table I.

These test results demonstrate that outstanding rheological performance can be obtained from samples containing as much as 75% paper pulp at either 2M2HT loading. The viscosity measurements recorded for the 25% organoclay/75% pulp sample was equivalent to those from pure BENTONE A-140 or ATTAGEL 50, which are organoclays presently commercially used in this type asphaltic system.

Leneta/sag was also improved along with a significant increase in the thixotropic index.

TABLE I

Rheological Performance vs 2M2HT Organoclay (OC) vs Pulp Loading

| Sample Description | Brookfield Vis. 10 rpm/100 rpm | TI* | Leneta Sag Mils |
|---|---|---|---|
| Attagel 50 | 42,400/23,600 | 1.80 | 20 |
| Bentone A-140 | 40,000/16,400 | 2.44 | 40 |
| Bentone 34 | 30,800/13,600 | 2.26 | 35 |
| 100 meq 75% OC/25% Pulp | 42,000/17,800 | 2.36 | 25 |
| 120 meq 75% OC/25% Pulp | 28,800/15,800 | 1.82 | 25 |
| 100 meq 50% OC/50% Pulp | 40,800/16,200 | 2.52 | 30 |
| 120 meq 50% OC/50% Pulp | 37,600/16,400 | 2.29 | 30 |
| 100 meq 25% OC/75% Pulp | 37,600/14,500 | 2.59 | 25 |
| 120 meq 25% OC/75% Pulp | 40,000/15,280 | 2.62 | 30 |

*TI is the numerical ratio of the 10 rpm viscosity to the 100 rpm viscosity.

Example 2

Additional studies were conducted to determine the influence of fiber length on the rheological performance of the inventive composition in an asphaltic system. Newspaper was used in this study that was pulped wet at 5% consistency to break the paper down to individual fibers. The slurry was filtered and the solids dried at 105° C. in a forced air oven. The dry fibers were then subjected to multiple passes in a centrifugal mill, analyzed by SEM and the long fibers were estimated to have an aspect ratio of ~100:1 and the short fibers ~5:1. These fibers were then used to prepare samples containing 75% pulp and 25% organoclay. The samples were prepared using a pug mill process, using crude bentonite clay and 2M2HT to make the organoclay at a 120 meq./100 grams of clay ratio (after correcting for the % gangue). All samples were dried at 105° C. in a forced air oven, milled in a centrifugal mill and tested in an asphaltic system with test results listed in Table II.

These results show that fiber length dramatically influences the rheological performance of the additive on the asphaltic system. Longer fiber lengths are preferred in that higher Brookfield viscosities and corresponding TI values are obtained.

The asphalt samples containing the ATTAGEL 50, BENTONE 34, long fibers and short fibers were used to prepare thin fills (⅛ inch thick). The fills were allowed to air dry at ambient temperature for 5 days on release paper. The samples were then transferred to a 50° C. forced air oven where drying was continued for 2 weeks. At this time four dog-bone tensile bars were cut from each asphalt film for testing (see Table III). Test results demonstrate that the presence of long fibers in the additive increased tensile strength by approximately 35% over the control sample (BENTONE 34). Long fibers are preferred over short fiber based on improved tensile strength and improved rheology. It was also noted that when the additive contained long fibers, that the maximum tensile strength obtained was greater than the yield point of the asphalt. On all other samples, the maximum tensile strength occurred at the yield point of the material.

TABLE II

Rheological Performance vs Pulp Fiber Length

| Sample Description | Brookfield Vis. 10 rpm/100 rpm | TI | Leneta Sag Mils |
|---|---|---|---|
| Attagel 50 | 25,200/14,000 | 1.8 | 20 |
| Bentone 34 | 29,600/13,400 | 2.21 | 40 |
| 25% OC/75% Pulp (Long) | 38,000/16,000 | 2.38 | 30 |
| 25% OC/75% Pulp (Medium) | 20,000/10,960 | 1.82 | 20 |
| 25% OC/75% Pulp (Short) | 16,000/9,680 | 1.65 | 19 |
| 100% Pulp (Long) | 52,400/22,000 | 2.38 | 30 |

TABLE III

Tensile Strength Of Asphalt Films Containing Pulp

| | | Tensile Bar | | | | |
|---|---|---|---|---|---|---|
| | | #1 | #2 | #3 | #4 | Average |
| Attagel 50 | Yield(Y) | 229 | 245 | 234 | 253 | 240 psi Yield |
| | Tensile(T) | 229 | 245 | 234 | 253 | 240 psi Tensile |
| | Break(B) | 111 | 90 | 123 | 161 | 121 psi Break |
| Bentone 34 | (Y) | 193 | 214 | 186 | 200 | 198 psi Yield |
| | (T) | 193 | 214 | 186 | 200 | 198 psi Tensile |
| | (B) | 132 | 156 | 123 | 120 | 132 psi Break |
| 120 meq 25% OC/75% Pulp (Long) | (Y) | 218 | 216 | 274 | 235 | 235 psi Yield |
| | (T) | 256 | 262 | 274 | 278 | 267 psi Tensile |
| | (B) | 195 | 146 | 141 | 187 | 167 psi Break |
| 120 meq 25% OC/75% Pulp (Short) | (Y) | 215 | 187 | 184 | 229 | 203 psi Yield |
| | (T) | 215 | 187 | 184 | 229 | 203 psi Tensile |
| | (B) | 87 | 116 | 87 | 73 | 90 psi Break |

Example 3

In this study, newspaper fibers were added to BENATHIX 1-4-1, a commercial organoclay, using two different processes 1) as a dry blend and 2) added during the preparation of the organoclay. The dry blends were prepared at organoclay to fiber ratios of 25:75, 50:50 and 75:25, respectively. The BENATHIX 1-4-1 was prepared in the laboratory by reaction of sheared bentonite clay with 110 meq dimethyl benzyl hydrogenated tallow ammonium chloride (2MBHT) /100 grams of clay and 23.3 meq sodium stearate/100 grams of clay. The reaction was performed at 1% clay solids in water at 65° C. for 30 minutes. The reaction solids were collected by vacuum filtration into a wet cake and the wet cake was then repulped at 5% solids in water for 30 minutes at 45° C. This material was vacuum filtered and the resultant wet cake dried at 40° C. in a forced air oven. The dry material was milled in a centrifugal mill.

The in-situ samples prepared with cellulosic fibers were made in a similar manner as described above. The only difference being pulped newspaper was added to the sheared bentonite clay slurry prior to reacting with the organic. Three samples were prepared at organoclay to fiber ratios of 25:75, 50:50 and 75:25. All samples were tested as rheological additives in unsaturated polyester resin using a "pregel" quality control test method. Results are listed in Table IV.

These results show that there is an improvement of the 75% BENATHIX 1-4-1/25% fiber composition over the 100% BENATHIX 1-4-1 and 100% fiber sample. This sample displayed improved Brookfield viscosity and higher TI from both the in-situ and pre-made dry blend samples.

TABLE IV

Organoclay/Fiber Composition For Polyester Resins Standard Pregel Test

| Description | Brookfield Vis. (cps) 6 rpm/60 rpm | TI |
|---|---|---|
| Benathix Control | 4100/1128 | 3.63 |
| Benathix 1-4-1 (B-141) Lab Prep. | 3620/1046 | 3.46 |
| In Situ 75% B-141/25% Fiber | 5060/1336 | 3.79 |
| In Situ 50% B-141/50%Fiber | 2660/864 | 3.08 |
| In Situ 25% B-141/75% Fiber | 1220/636 | 1.92 |
| Dry Blend 75% B-141/25% Fiber | 4800/1312 | 3.66 |
| Dry Blend 50% B-141/50% Fiber | 3840/1144 | 3.36 |
| Dry Blend 25% B-141/75% Fiber | 2000/940 | 2.13 |
| 100% Fiber | 1580/870 | 1.82 |

Example 4

This example demonstrates that other organic fibrous material could be prepared with other than paper fibers to make the inventive products of this invention. Cotton was chosen because it is readily available. Cotton fibers from pharmaceutical grade cotton was cut into approximately ½ inch segments and mixed with a beneficiated bentonite clay slurry in a 3 liter stainless steel beaker. The mixture was heated to 65° C. under agitation from a Cowles dispersator. Separately in a beaker a quaternary ammonium compond (Adogen 462) along with soya oil were mixed together and heated to 65° C. Adogen 462 is a commercial coconut oil derived quaternary ammonium chloride (2M2C). The amount of Adogen 462 used was 113% organic. The soya oil was 8% by weight of the organoclay weight. The final weight ratio of organoclay to cotton was 1:1. The Adogen 462/soya oil blend was added to the clay/cotton mixture and allowed to react for 30 minutes at 65° C. The product was then vacuum filtered and dried at 105° C. in a forced air oven producing the inventive compositions.

The invention composition was found to have excellent cold temperature solidification (CTS) properties, indicating excellent rheological properties at temperatures starting below 0° C.

Example 5

This example shows preparation of inventive compositions involving the addition of newspaper pulp and soya oil and Adogen 462/bentonite clay.

Compositions were prepared by adding different loadings by weight of newspaper pulp to the bentonite clay slurry and then mixing to disperse the pulp. Three different loadings of paper pulp (10%, 25% and 50%) were used with each of the two organoclay compositions. This mixture was heated to 65° C. prior to reacting with 122% organic. The Adogert 462 was heated to 65° C. before adding it to the bentonite/paper pulp slurry and reacted 30 minutes at 65° C.; it was then vacuum filtered and dried at 105° C. in a forced air oven.

Soya oil was added to the Adogert 462 prior to reacting with the clay (8% soya oil based on final organoclay sample weight) thus preparing the inventive compositions.

Example 6

This example shows that the additives of this invention can continually and inexpensively be made by a pug mill process provided preparation conditions are selected to allow the organoclay reaction to go to completion. Several samples were prepared in a pug mill at various organoclay/ waste newspaper pulp ratios of 100/0, 75/25, 50/50, 25/75, 10/90 and 0/100. The newspaper pulp was prepared using spent Philadelphia Enquirer newspaper that was pulped at 5% solids in water at room temperature using a Hockmeyer mixer. The pulp was then vacuum filtered to 18.3% solids to produce a consistency better suited for pug milling. The pulp was then pug milled with an appropriate amount of crude bentonite clay at room temperature to form a blend. The crude clay/pulp blend was then heated to 65° C. in a forced air oven. Separately, the appropriate amount of Adogen 462 and soya oil for each sample was blended together and heated to 65° C. The amount of Adogert 462 used was 113% organic based on pure unsheared bentonite clay (the crude clay, including impurities, used actually contained 77% bentonite). The amount of soya oil used was 8% by weight of the organoclay fraction of the sample. The Adogert 462/soya oil blend was pug milled with the crude clay/newspaper pulp/water blend at 65° C. All samples were dried in a 105° C. forced air oven and then milled in a centrifugal mill for one pass through a 0.5 mm screen.

This example shows that a viable inventive product can be prepared at low cost in a pug mill and that a wide variety of pulp to organoclay ratios are available.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A dry rheological additive for organic fluid systems comprising:
    (a) one or more organoclays made by the reaction of smectite clay and one or more organic cations at a percent organic of from about 80% to about 140% of the cation exchange capacity of the smectite clay and;
    (b) one or more fibrous materials.

2. The additive of claim 1 wherein the organoclay is made with a smectite clay selected from the group consisting of bentonite and hectorite.

3. The additive of claim 1 wherein the organic cation is provided by one or more quaternary ammonium chloride compounds.

4. The additive of claim 1 wherein the fibrous material is organic.

5. The additive of claim 4 where at least one of the organic fibrous materials is selected from the group consisting of paper pulp, cotton fiber, wool fiber and hemp fiber.

6. The additive of claim 1, wherein an organic anion or anions is added in an mount sufficient to react with said one or more organic cations which exceed the cation exchange capacity of the smectite clay.

7. The additive of claim 1, wherein the dry rheological additive was made in situ in an aqueous system containing said one or more fibrous materials.

8. A process for preparing a dry rheological additive for organic fluid systems which comprises:
    (a) preparing an aqueous slurry of a smectite clay having a cation exchange capacity of at least 75 milliequivalents per 100 grams of natural clay:
    (b) heating said slurry to a temperature between 20° C. and 100° C.;
    (c) adding to said slurry one or more organic cations in an amount to satisfy the cation exchange capacity of the smectite clay;
    (d) continuing the reaction for a sufficient time to form an organoclay;
    (e) adding waste paper to the slurry; and
    (f) recovering and drying the resultant rheological additive.

9. The process of claim 8, wherein the organic cation is provided by a quaternary ammonium chloride compound.

10. The process of claim 8, wherein an organic anion or anions is added in an amount sufficient to react with said one or more organic cations which exceed the cation exchange capacity of the smectite clay.

11. The process of claim 10, wherein the organic cations or cations and said organic anion or anions are added simultaneously to said aqueous slurry.

12. The process of claim 8, wherein the waste paper is added to the slurry prior to the formation of the organoclay.

* * * * *

UNITED STATES PATENT AND TRADEMARK OFFICE
CERTIFICATE OF CORRECTION

PATENT NO. : 5,735,943
DATED : April 7, 1998
INVENTOR(S) : Charles A. Cody and Steven Kemnetz It is certified that error appears in the above-indentified patent and that said Letters Patent is hereby corrected as shown below:

In the Abstract [57]:

Line 2, change "day" to --clay--.
Lines 4 and 5, change "theological" to --rheological--.

Column 1, line 55, change "theology" to --rheology--.
Column 2, line 16, change "theological" to --rheological--.
Column 2, line 66, change "theological" to --rheological--.
Column 4, line 44, change "theological" to --rheological--.
Column 7, line 38, change "theological" to --rheological--.
Column 7, line 48, "newsprinn" should be --newsprint--.
Column 8, line 31, change "theological" to --rheological--.
Column 11, line 7, "fills" should be --films--.
Column 11, line 18, "deskable" should be --desirable--.
Column 11, line 45, "kernamine" should be --kemamine--.
Column 11, line 61, change "theological" to --rheological--.
Column 12, line 52, change "fills" to --films--.
Column 13, line 29, Table III, bring line "B" up one line.
Column 13, line 31, Table III, bring line "B" up one line.
Column 14, lines 32, 50 and 54, "Adogert" should be --Adogen--.
Column 15, lines 7 and 11, "Adogert" should be --Adogen--.

UNITED STATES PATENT AND TRADEMARK OFFICE
CERTIFICATE OF CORRECTION

PATENT NO. : 5,735,943
DATED : April 7, 1998
INVENTOR(S) : Charles A. Cody and Steven Kemnetz It is certified that error appears in the above-indentified patent and that said Letters Patent is hereby corrected as shown below:

Column 16, claim 6, line 5, "mount" should be --amount--.

Signed and Sealed this

Fourth Day of August, 1998

Attest:

Attesting Officer

BRUCE LEHMAN

*Commissioner of Patents and Trademarks*